(12) United States Patent
Yamaoka et al.

(10) Patent No.: US 11,095,827 B2
(45) Date of Patent: Aug. 17, 2021

(54) IN-VEHICLE CAMERA SYSTEM

(71) Applicant: Toyota Jidosha Kabushiki Kaisha, Toyota (JP)

(72) Inventors: Masaaki Yamaoka, Tokyo (JP); Naotoshi Kadotani, Tokyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/662,802

(22) Filed: Oct. 24, 2019

(65) Prior Publication Data

US 2020/0169656 A1 May 28, 2020

(30) Foreign Application Priority Data

Nov. 28, 2018 (JP) .............................. JP2018-222317

(51) Int. Cl.
*H04N 5/235* (2006.01)
*H04N 5/238* (2006.01)
*H04N 5/247* (2006.01)

(52) U.S. Cl.
CPC ........... *H04N 5/2351* (2013.01); *H04N 5/238* (2013.01); *H04N 5/247* (2013.01)

(58) Field of Classification Search
None
See application file for complete search history.

(56) References Cited

U.S. PATENT DOCUMENTS

| 10,467,487 | B1 * | 11/2019 | Wang | ...................... | B60R 1/005 |
| 2007/0153086 | A1 * | 7/2007 | Usui | ...................... | H04N 5/235 |
| | | | | | 348/153 |
| 2010/0087982 | A1 * | 4/2010 | Allen | ...................... | G01M 17/00 |
| | | | | | 701/29.1 |
| 2015/0086079 | A1 | 3/2015 | Murao et al. | | |
| 2015/0092066 | A1 * | 4/2015 | Geiss | ...................... | H04N 5/235 |
| | | | | | 348/180 |
| 2015/0244918 | A1 * | 8/2015 | Svensson | ............. | H04N 5/2353 |
| | | | | | 348/229.1 |
| 2016/0059781 | A1 * | 3/2016 | Tatara | ....................... | B60R 1/00 |
| | | | | | 348/148 |
| 2016/0269597 | A1 * | 9/2016 | Kanatani | ............... | H04N 1/6027 |
| 2017/0113613 | A1 * | 4/2017 | Van Dan Elzen | ..... | G06K 9/209 |
| 2017/0186183 | A1 * | 6/2017 | Armstrong | ............. | G01C 11/00 |
| 2019/0230347 | A1 * | 7/2019 | Itoh | ......................... | G03B 15/00 |
| 2019/0359131 | A1 * | 11/2019 | Wama | ................... | B60Q 1/0023 |
| 2019/0369635 | A1 * | 12/2019 | Kobayashi | ........ | B60W 60/0059 |
| 2020/0169656 | A1 * | 5/2020 | Yamaoka | ............... | H04N 7/181 |
| 2020/0271786 | A1 * | 8/2020 | Mano | ....................... | G01S 17/87 |

FOREIGN PATENT DOCUMENTS

| EP | 3396412 A1 | 10/2018 |
| JP | 6176028 B2 | 8/2017 |
| WO | 2017-110415 A1 | 6/2017 |

* cited by examiner

*Primary Examiner* — Chikaodili E Anyikire
(74) *Attorney, Agent, or Firm* — Dinsmore & Shohl LLP

(57) ABSTRACT

An in-vehicle camera system including a far camera and a near camera, both of which capture an image ahead of a vehicle, includes a determining unit configured to, during travel of the vehicle, determine whether an illumination of an image captured by the far camera is abnormal as a result of an illumination change ahead of the vehicle, and an aperture control unit configured to, when the determining unit determines that the illumination of the image captured by the far camera is abnormal, execute aperture control over the near camera.

7 Claims, 5 Drawing Sheets

IN-VEHICLE CAMERA SYSTEM

CROSS-REFERENCE TO RELATED APPLICATIONS

This application claims priority to Japanese Patent Application No. 2018-222317 filed on Nov. 28, 2018, which is incorporated herein by reference in its entirety including the specification, drawings and abstract.

BACKGROUND

1. Technical Field

The disclosure relates to an in-vehicle camera system.

2. Description of Related Art

Hitherto, Japanese Patent No. 6176028 (JP 6176028 B) is known as a technical document on image recognition of an in-vehicle camera. This document describes a system that generates a plurality of pieces of individual image data with different brightness from one image data captured with an in-vehicle camera oriented ahead of a vehicle with the use of a plurality of filters and that, even when there are blown out highlights or blocked up shadows in any one of the pieces of individual image data, recognizes an image of an object, such as a preceding vehicle, by using the pieces of individual image data where there are no blown out highlights or blocked up shadows.

SUMMARY

Incidentally, it is known that blown out highlights, or the like, occur as a result of a delay of aperture change of the in-vehicle camera when there occurs a sudden illumination change, for example, after the vehicle leaves a tunnel. The above-described existing system generates a plurality of pieces of individual image data with different brightness from one image data and selects individual image data where there are no blown out highlights, or the like. However, it is not easy to constantly execute such processing. For this reason, an in-vehicle camera system that is able to appropriately continue to capture an image by controlling an in-vehicle camera according to a situation in which a sudden illumination change occurs in course of travel of a vehicle is desired.

An aspect of the disclosure relates to an in-vehicle camera system including a far camera and a near camera, both of which capture an image ahead of a vehicle. The in-vehicle camera system includes a determining unit configured to, during travel of the vehicle, determine whether an illumination of an image captured by the far camera is abnormal as a result of an illumination change ahead of the vehicle, and an aperture control unit configured to, when the determining unit determines that the illumination of the image captured by the far camera is abnormal, execute aperture control over the near camera.

With the in-vehicle camera system according to the aspect of the disclosure, when it is determined that the illumination of the image captured by the far camera that captures an image ahead of the vehicle is abnormal during travel of the vehicle, aperture control over the near camera that captures an image ahead of the vehicle is executed. Therefore, in a situation in which there occurs a sudden illumination change, for example, when the vehicle leaves a tunnel, occurrence of an abnormality in the illumination of an image that is captured by the near camera subsequent to the far camera is reduced. Therefore, capturing an image with the near camera is appropriately continued.

The in-vehicle camera system according to the aspect of the disclosure may further include a timing determining unit configured to, when the determining unit determines that the illumination of the image captured by the far camera is abnormal, determine whether the vehicle is placed at a preset aperture adjustment start timing based on a travel distance of the vehicle or an elapsed time, and the aperture control unit may be configured to, when the timing determining unit determines that the vehicle is placed at the aperture adjustment start timing, start the aperture control over the near camera. With this in-vehicle camera system, even when it is determined that the illumination of the image captured by the far camera is abnormal, there is still a time difference until the illumination of an image that is captured by the near camera becomes abnormal. Therefore, when aperture control over the near camera is started at the time when it is determined that the vehicle is placed at the aperture adjustment start timing, aperture control over the near camera is executed at appropriate timing while avoiding early aperture control.

The in-vehicle camera system according to the aspect of the disclosure may further include an illumination normalization determining unit configured to, when the determining unit determines that the illumination of the image captured by the far camera is abnormal, determine whether the illumination of the image captured by the far camera is normalized in course of travel of the vehicle, and the aperture control unit may be configured to, when the illumination normalization determining unit determines that the illumination of the image captured by the far camera is normalized, cancel the aperture control over the near camera. With this in-vehicle camera system, when an abnormality in the illumination of the image captured by the far camera is temporary and the illumination is normalized in course of travel of the vehicle, aperture control over the near camera is cancelled, so unnecessary aperture control over the near camera is avoided.

With the in-vehicle camera system according to the aspect of the disclosure, capturing an image with the near camera is appropriately continued according to a situation in which a sudden illumination change occurs in course of travel of the vehicle.

BRIEF DESCRIPTION OF THE DRAWINGS

Features, advantages, and technical and industrial significance of exemplary embodiments of the disclosure will be described below with reference to foe accompanying drawings, in which like numerals denote like elements, and wherein.

DETAILED DESCRIPTION OF EMBODIMENTS

Hereinafter, an embodiment of the disclosure will be described with reference to the accompanying drawings.

Figure 1:
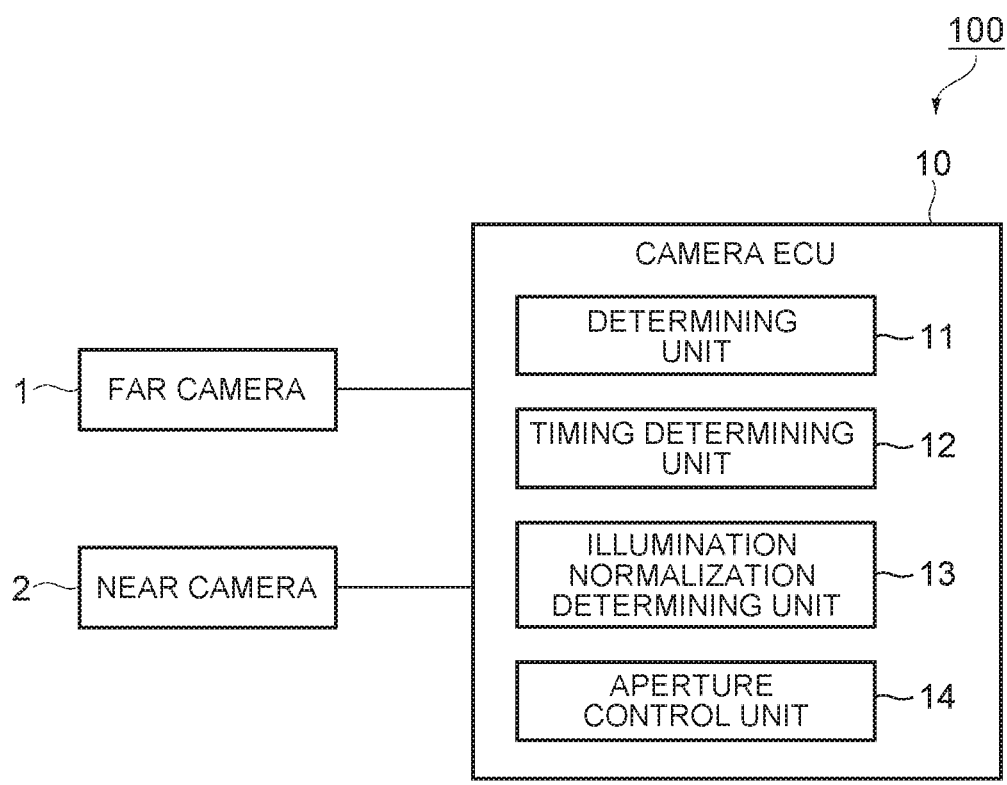
FIG. 1 is a block diagram that shows an in-vehicle camera system according to an embodiment.

FIG. 1 is a block diagram that shows an in-vehicle camera system according to the embodiment. The in-vehicle camera system 100 shown in FIG. 1 is a camera system that is mounted on a vehicle, such as a passenger automobile, and that captures an image around the vehicle.

Configuration of In-Vehicle Camera System

As shown in FIG. 1, the in-vehicle camera system 100 includes a far camera 1, a near camera 2, and a camera electronic control unit (ECU) 10. The far camera 1 and the near camera 2 are cameras that capture an image ahead of the vehicle. The far camera 1 and the near camera 2 are provided, for example, on the back side of the windshield of the vehicle. The far camera 1 and the near camera 2 may be separate cameras or may be a combination camera in which part of a body is shared.

Figure 2:
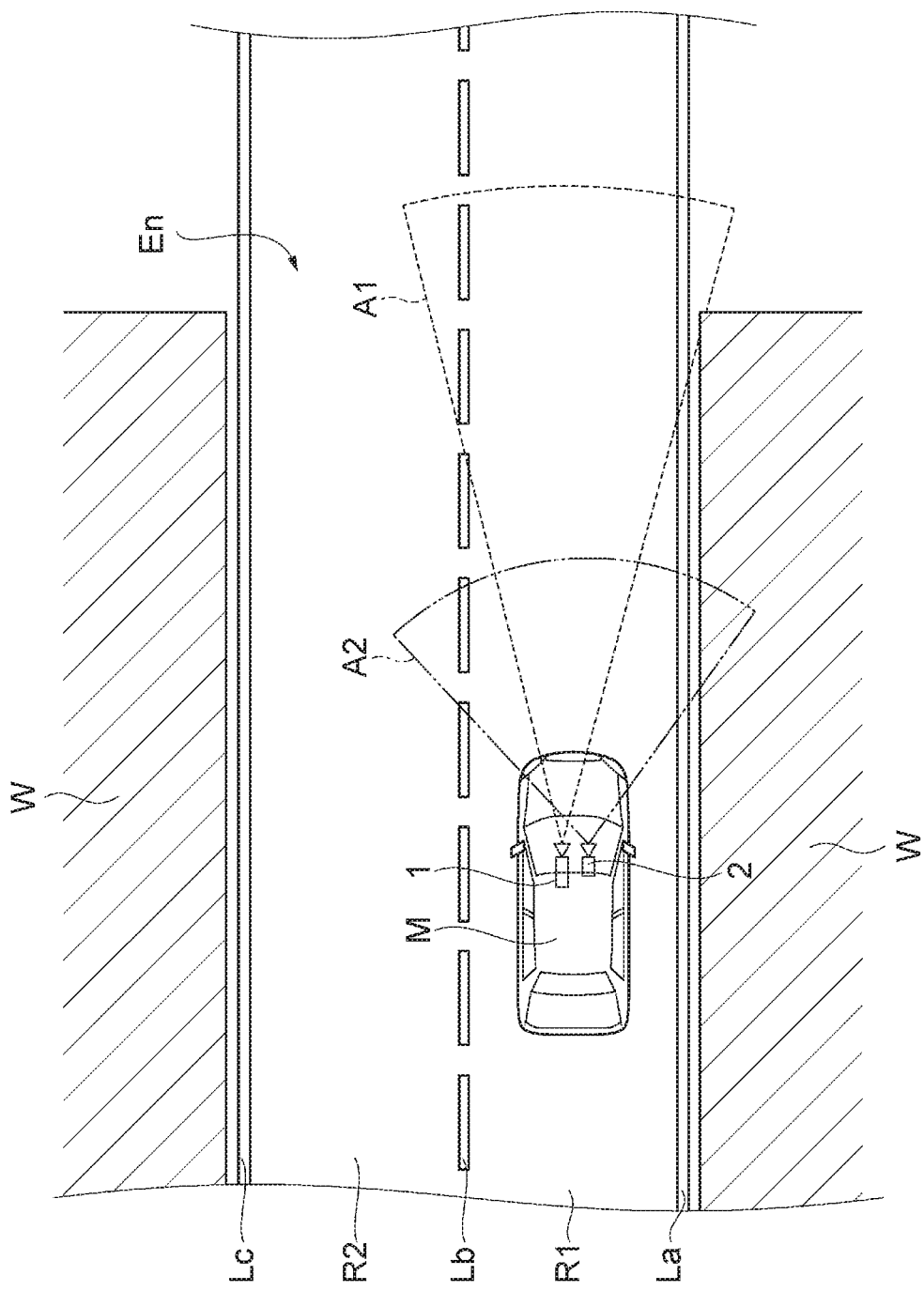
FIG. 2 is a plan view for illustrating an example of a far camera and near camera.

FIG. 2 is a plan view for illustrating an example of the far camera and near camera. FIG. 2 shows a vehicle M traveling in a tunnel, a capture range A1 of the far camera 1, and a capture range A2 of the near camera 2. FIG. 2 also shows a driving lane R1 of the vehicle M, an adjacent lane R2, a right-side partition line La of the driving lane R1, a partition line Lb between the driving lane R1 and the adjacent lane R2, a left-side partition line Lc of the adjacent lane R2, tunnel walls W, and a tunnel exit En. It is assumed that the outside of the tunnel is in an environment in which dazzling sunlight falls and there is a large difference in illumination between the inside of the tunnel and the outside of the tunnel.

As shown in FIG. 2, the far camera 1 is a camera for capturing an image farther from the vehicle M than the near camera 2. The capture range A1 of the far camera 1 contains a range on the far side of the capture range A2 of the near camera 2. The near camera 2 is a camera for capturing an image closer to the vehicle M than the far camera 1. The capture range A2 of the near camera 2 contains, for example, a range wider and closer to the vehicle M than the capture range A1 of the far camera 1. The capture range A2 of the near camera 2 is not necessarily limited to a range wider than the capture range A1 of the far camera 1.

The camera ECU 10 is an electronic control unit including a central processing unit (CPU), a read only memory (ROM), a random access memory (RAM), a controller area network (CAN) communication circuit, and the like. In the camera ECU 10, for example, a program stored in the ROM is loaded onto the RAM, and the CPU runs the program loaded on the RAM. Thus, various functions are implemented. The camera ECU 10 may be made up of a plurality of electronic control units. The camera ECU 10 may be integrated with an ECU for the vehicle, which executes various control over the vehicle.

As shown in FIG. 1, the camera ECU 10 includes a determining unit 11, a timing determining unit 12, an illumination normalization determining unit 13, and an aperture control unit 14.

The determining unit 11 determines whether the illumination of an image captured by the far camera 1 is abnormal as a result of an illumination change ahead of the vehicle M during travel of the vehicle M. An abnormality in illumination due to an illumination change is an abnormality in capturing an image due to a sudden change in illumination. An abnormality in illumination due to an illumination change includes so-called blown out highlights (whiteout) and blocked up shadows (blackout). The determining unit 11 determines whether the illumination is abnormal based on an image captured by the far camera 1.

Such an abnormality in illumination occurs, for example, when, as shown in FIG. 2, the vehicle M that travels in a dark tunnel approaches the tunnel exit En and dazzling light outside the tunnel enters the capture range A1 of the far camera 1 adjusted to the darkness in the tunnel. Such a situation is not limited to a tunnel, and also occurs in an outdoor parking lot (for example, a multistory parking lot). Such a situation also occurs when the vehicle M exits from behind a building or the like even outdoors. The determining unit 11 may determine that the illumination is abnormal when recognition of a target (such as a sign) or partition line is disabled under the influence of illumination on the image captured by the far camera 1.

When the determining unit 11 determines that the illumination of the image captured by the far camera 1 is abnormal, the timing determining unit 12 determines whether the vehicle M is placed at preset aperture adjustment start timing based on a travel distance of the vehicle M or an elapsed time. Aperture adjustment start timing is timing set in advance for a travel distance of the vehicle M or an elapsed time.

Aperture adjustment start timing may be determined in advance based on the difference in focal length between the far camera 1 and the near camera 2. For example, even when the illumination of the image captured by the far camera 1 is abnormal in the situation shown in FIG. 2, there is still a time difference until the illumination of an image that is captured by the near camera 2 becomes abnormal. Therefore, when aperture adjustment start timing is set, an appropriate capturing state of the near camera 2 in the tunnel is maintained, while occurrence of an abnormality in illumination in the near camera 2 after the aperture adjustment start timing is reduced.

The timing determining unit 12 determines that the vehicle M is placed at the aperture adjustment start timing, for example, when the travel distance of the vehicle M from when the determining unit 11 determines that the illumination of the image captured by the far camera 1 is abnormal has reached a preset aperture adjustment start travel distance. A travel distance can be acquired from, for example, the rotation speed of a wheel, detected by a vehicle speed sensor. The timing determining unit 12 may determine that the vehicle M is placed at the aperture adjustment start timing when an elapsed time from when the determining unit 11 determines that the illumination of the image captured by the far camera 1 is abnormal has reached a preset aperture adjustment start time. The aperture adjustment start travel distance and the aperture adjustment start time may be determined in advance based on the difference in focal length between the far camera 1 and the near camera 2. The aperture adjustment start time may be set to a shorter time as the vehicle speed increases.

When the determining unit 11 determines that the illumination of the image captured by the far camera 1 is abnormal, the illumination normalization determining unit 13 determines whether the illumination of the image captured by the far camera 1 is normalized in course of travel of the vehicle M. Normalization of the illumination in course of travel of the vehicle M is that, after the illumination becomes abnormal, the abnormality in illumination disappears in course of travel of the vehicle M (for example, a change in the orientation of the vehicle M) before execution of aperture control, or the like. A change in the orientation of the vehicle M or travel of the vehicle M does not necessarily need to be detected. The illumination normalization determining unit 13 determines whether the illumination is normalized based on the image captured by the far camera 1.

Figure 3:
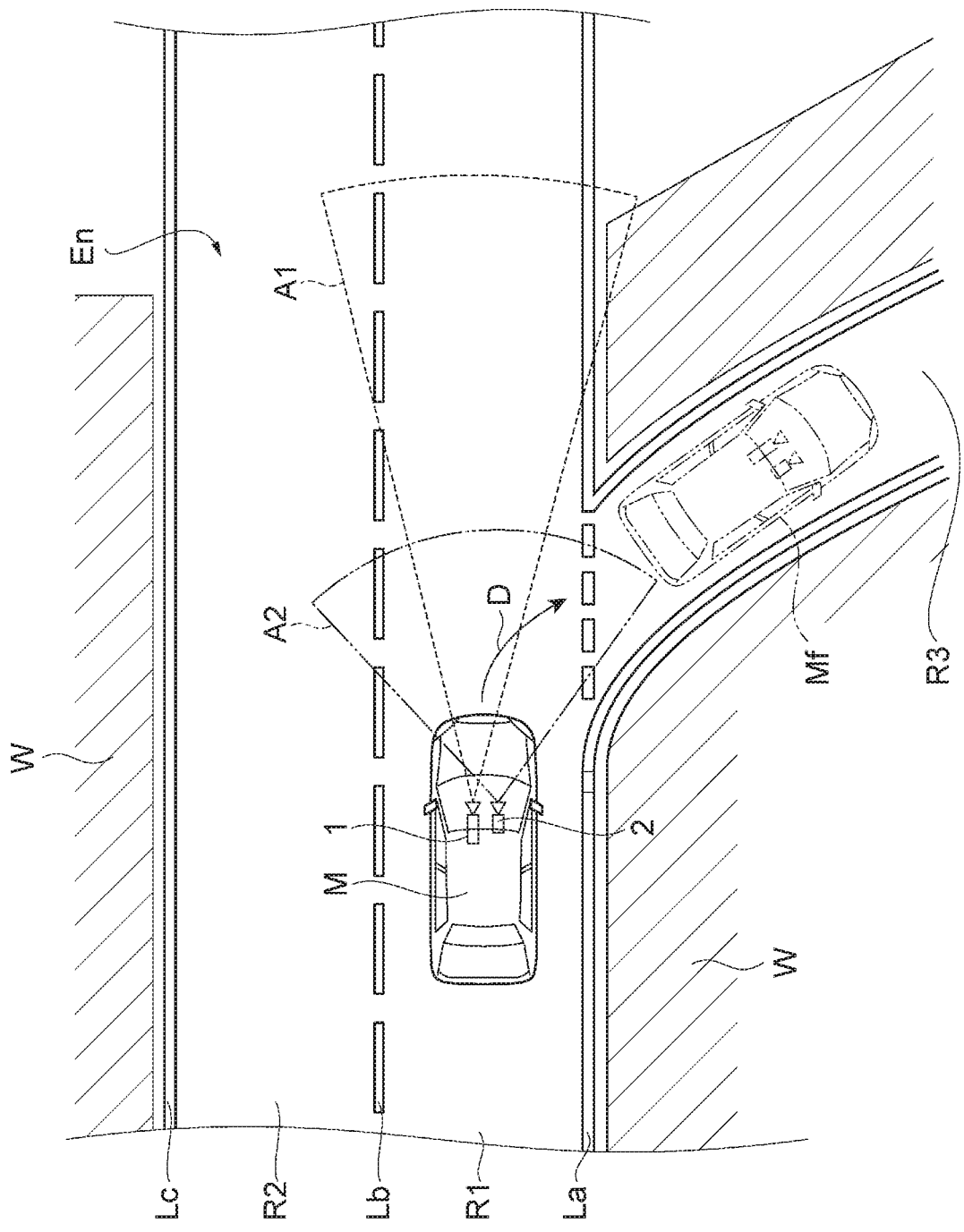
FIG. 3 is a plan view for illustrating an example in which the illumination of an image captured by the far camera is normalized.

FIG. 3 is a plan view for illustrating an example in which the illumination of the image captured by the far camera is normalized. FIG. 3 shows a branch road R3 in a tunnel, a course D of the vehicle M that approaches toward the branch road R3, and a position Mf of the vehicle M at the time of entry into the branch road R3. In the situation shown in FIG. 3, it is determined that the illumination of the image captured by the far camera 1 is abnormal because the vehicle M has approached the tunnel exit En ahead; however, the capture range A1 of the far camera 1 is the inside of the tunnel when the vehicle M approaches to the branch road R3, so the illumination is normalized in the captured image.

The aperture control unit 14 executes aperture control over the near camera 2 when the timing determining unit 12 determines that the vehicle M has reached aperture adjustment start timing. Aperture control over the near camera 2 is executed, for example, in response to occurrence of an abnormality in the illumination of the image captured by the far camera 1.

Specifically, when the abnormality in illumination in the far camera 1 is blown out highlights, the aperture control unit 14 controls the aperture of the near camera 2 such that the aperture is narrowed. When the abnormality in illumination in the far camera 1 is blocked up shadows, the aperture control unit 14 controls the aperture of the near camera 2 such that the aperture is expanded. The aperture control unit 14 may classify the degree of abnormality in the illumination of the image captured by the far camera 1 into multiple levels and execute different aperture control over the near camera 2 on a level-by-level basis. The aperture control unit 14 may execute aperture control such that partition lines and target (such as a sign) far ahead from the vehicle M are recognized by the near camera 2 regardless of what kind of abnormality in illumination in the far camera 1.

The aperture control unit 14 may adjust the aperture in multiple levels according to a travel distance of the vehicle M or an elapsed time as aperture control over the near camera 2. The aperture control unit 14 executes aperture control over the near camera 2 by, for example, after it is determined that the vehicle M is placed at the aperture adjustment start timing, advancing adjustment of the aperture in a stepwise manner at intervals of a set travel distance. The aperture control unit 14 may execute aperture control over the near camera 2 by, for example, after it is determined that the vehicle M is placed at the aperture adjustment start timing, advancing adjustment of the aperture in a stepwise manner at set time intervals. When aperture control is advanced in a stepwise manner in this way, interference with capturing with the near camera 2 is reduced when the illumination is normalized in the far camera 1. The aperture control unit 14 may continuously adjust the aperture according to a travel distance of the vehicle M or an elapsed time as aperture control over the near camera 2.

Before the timing determining unit 12 determines that the vehicle M is placed at the aperture adjustment start timing, when it is determined that the illumination of the image captured by the far camera 1 is normalized in course of travel of the vehicle, the aperture control unit 14 cancels aperture control over the near camera 2 (cancels the schedule for aperture control). For example, when the illumination of the image captured by the far camera 1 is normalized as a result of travel of the vehicle M as shown in FIG. 3, aperture control over the near camera 2 is not necessary, so the aperture control unit 14 does not execute aperture control.

After the timing determining unit 12 determines that the vehicle M is placed at the aperture adjustment start timing, when it is determined that the illumination of the image captured by the far camera 1 is normalized in course of travel of the vehicle, the aperture control unit 14 cancels aperture control over the near camera 2. Cancellation of aperture control over the near camera 2 means return to a state before aperture control is executed. When the aperture control unit 14 is advancing aperture control over the near camera 2 in a stepwise manner, the near camera 2 is returned to an original state as a result of cancellation of aperture control. For example, when a set time has elapsed from completion of aperture control, the aperture control unit 14 does not cancel aperture control over the near camera 2 even when it is determined that the illumination of the image captured by the far camera 1 is normalized.

Process of In-Vehicle Camera System

Figure 4:
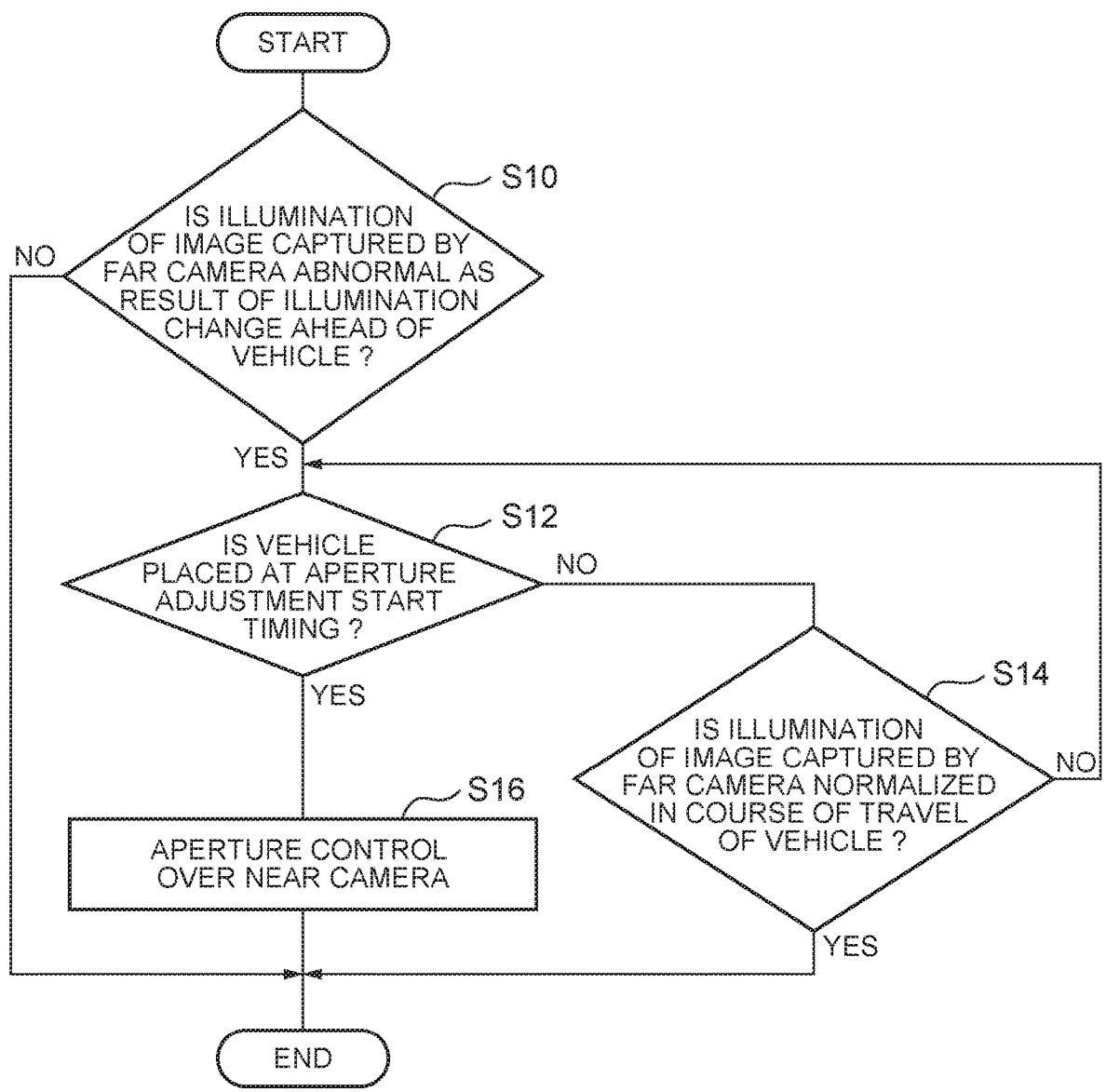
FIG. 4 is a flowchart that shows an example of an aperture control process of the in-vehicle camera system.

Next, a process of the in-vehicle camera system 100 according to the present embodiment will be described with reference to FIG. 4 and FIG. 5. FIG. 4 is a flowchart that shows an example of an aperture control process of the in-vehicle camera system 100. The aperture control process is executed, for example, during travel of the vehicle M.

As shown in FIG. 4, the camera ECU 10 of the in-vehicle camera system 100 causes the determining unit 11 to determine in S10 whether the illumination of the image captured by the far camera 1 is abnormal as a result of an illumination change ahead of the vehicle M during travel of the vehicle M. The determining unit 11 determines whether the illumination is abnormal based on the image captured by the far camera 1. When the camera ECU 10 determines that the illumination of the image captured by the far camera 1 is abnormal (YES in S10), the camera ECU 10 proceeds to S12. When the camera ECU 10 determines that the illumination of the image captured by the far camera 1 is not abnormal (NO in S10), the camera ECU 10 ends the current process. The camera ECU 10 repeats the process from S10 again after a lapse of a set time.

In S12, the camera ECU 10 causes the timing determining unit 12 to determine whether the vehicle M is placed at the aperture adjustment start timing. The timing determining unit 12 determines whether the vehicle M is placed at the aperture adjustment start timing based on a travel distance of the vehicle M or an elapsed time. When the camera ECU 10 determines that the vehicle M is not placed at the aperture adjustment start timing (NO in S12), the camera ECU 10 proceeds to S14. When the camera ECU 10 determines that the vehicle M is placed at the aperture adjustment start timing (YES in S12), the camera ECU 10 proceeds to S16.

In S14, the camera ECU 10 causes the illumination normalization determining, unit 13 to determine whether the illumination of the image captured by the far camera 1 is normalized in course of travel of the vehicle M. The illumination normalization determining unit 13 determines whether the illumination is normalized based on the image captured by the far camera 1. When the camera ECU 10 determines that the illumination of the image captured by the far camera 1 is normalized (YES in S14), the camera ECU 10 does not execute aperture control over the near camera 2 (cancels aperture control), and ends the current process. The camera ECU 10 repeats the process from S10 again after a lapse of a set time. When the camera ECU 10 determines that the illumination of the image captured by the far camera 1 is not normalized (NO in S14), the camera ECU 10 returns to S12 and repeats the process.

In S16, the camera ECU 10 causes the aperture control unit 14 to execute aperture control over the near camera 2. Aperture control over the near camera 2 is executed, for example, in response to occurrence of an abnormality in the illumination of the image captured by the far camera 1. After that, the camera ECU 10 ends the current process and repeats the process from S10 again after a lapse of a set time.

Figure 5:
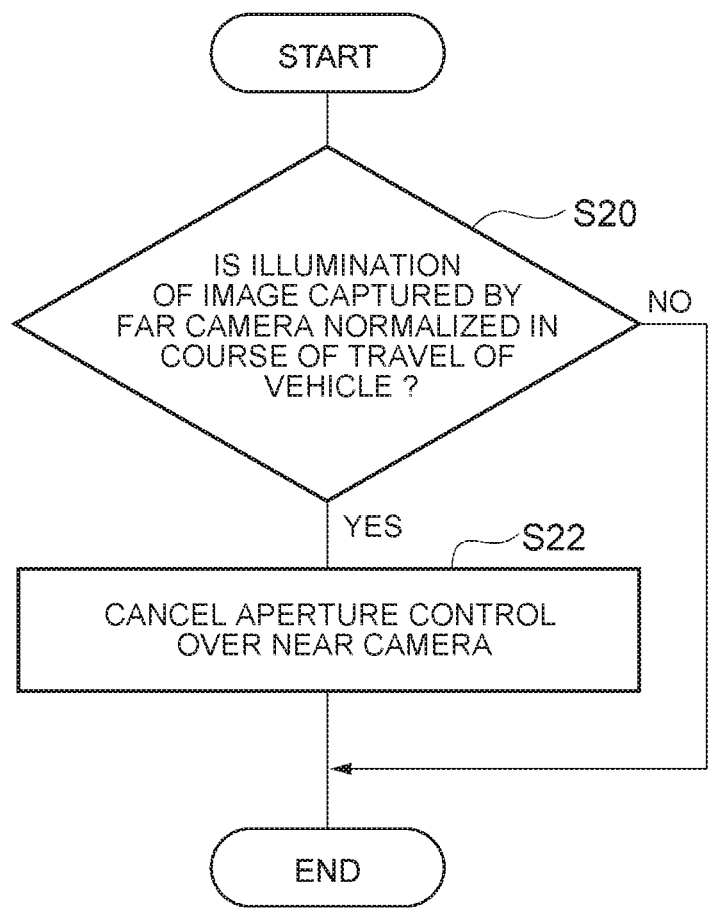
FIG. 5 is a flowchart that shows an example of an aperture control cancellation process of the in-vehicle camera system.

FIG. 5 is a flowchart that shows an example of an aperture control cancellation process of the in-vehicle camera system. The aperture control cancellation process shown in FIG. 5 is executed when aperture control is being executed in S16 shown in FIG. 4. The aperture control cancellation process may be executed not only during execution of aperture control but also within a set time from completion of aperture control.

As shown in FIG. 5, the camera ECU 10 causes the illumination normalization determining unit 13 to determine in S20 whether the illumination of the image captured by the far camera 1 is normalized in course of travel of the vehicle M. When the camera ECU 10 determines that the illumination of the image captured by the far camera 1 is normalized (YES in S20), the camera ECU 10 proceeds to S22. When the camera ECU 10 determines that the illumination of the image captured by the far camera 1 is not normalized (NO in S20), the camera ECU 10 ends the current process.

In the above-described in-vehicle camera system 100 according to the present embodiment, when it is determined that the illumination of an image captured by the far camera 1 that captures an image ahead of the vehicle M is abnormal during travel of the vehicle M, aperture control over the near camera 2 that captures an image ahead of the vehicle M is executed. Therefore, in a situation in which a sudden illumination change occurs, for example, when the vehicle M leaves a tunnel, occurrence of an abnormality in the illumination of the image captured by the near camera 2 subsequent to the far camera 1 is reduced. Therefore, capturing an image with the near camera 2 is appropriately continued.

With the in-vehicle camera system 100, even when it is determined that the illumination of the image captured by the far camera 1 is abnormal, there is still a time difference until the illumination of an image that is captured by the near camera 2 becomes abnormal. Therefore, when aperture control over the near camera 2 is started at the lime when it is determined that the vehicle M is placed at the aperture adjustment start liming, aperture control over the near camera 2 is executed at appropriate timing while avoiding early aperture control.

With this in-vehicle camera system 100, when an abnormality in the illumination of the image captured by the far camera 1 is temporary and the illumination is normalized in course of travel of the vehicle, aperture control over the near camera 2 is cancelled, so unnecessary aperture control over the near camera 2 is avoided.

The embodiment of the disclosure is described above; however, the disclosure is not limited to the above-described embodiment. The disclosure may be implemented in not only the above-described embodiment but also various modes with various changes or improvements based on the knowledge of persons skilled in the art.

The in-vehicle camera system 100 does not necessarily include the timing determining unit 12. The in-vehicle camera system 100 may be configured in a mode in which, when the determining unit 11 determines that the illumination of the image captured by the far camera 1 is abnormal, aperture control over the near camera 2 is immediately executed.

The in-vehicle camera system 100 does not always need to include the illumination normalization determining unit 13. The in-vehicle camera system 100 may execute aperture control over the near camera 2 even when an abnormality in the illumination of the image captured by the far camera 1 has disappeared.

What is claimed is:

1. An in-vehicle camera system including a far camera and a near camera, both of which capture an image ahead of a vehicle, the in-vehicle camera system comprising:
    an electronic control unit configured to, during travel of the vehicle, determine whether an illumination of an image captured by the far camera is abnormal as a result of an illumination change ahead of the vehicle; and
    the electronic control unit being configured to, when the electronic control unit determines that the illumination of the image captured by the far camera is abnormal, execute aperture control over the near camera,
    wherein the illumination of the image captured by the far camera is abnormal as the result of the illumination change ahead of the vehicle due to a blown out headlight or blocked up shadows.

2. The in-vehicle camera system according to claim 1, wherein the electronic control unit being further configured to, when the electronic control unit determines that the illumination of the image captured by the far camera is abnormal, determine whether the vehicle is placed at a preset aperture adjustment start timing based on a travel distance of the vehicle or an elapsed time, wherein the electronic control unit is configured to, when the electronic control unit determines that the vehicle is placed at the aperture adjustment start timing, start the aperture control over the near camera.

3. The in-vehicle camera system according to claim 1, wherein the electronic control unit being further configured to, when the electronic control unit determines that the illumination of the image captured by the far camera is abnormal, determine whether the illumination of the image captured by the far camera is normalized in course of travel of the vehicle, wherein the electronic control unit is configured to, when the electronic control unit determines that the illumination of the image captured by the far camera is normalized, cancel the aperture control over the near camera.

4. An in-vehicle camera system including a far camera and a near camera, both of which capture an image ahead of a vehicle, the in-vehicle camera system comprising:
    an electronic control unit configured to, during travel of the vehicle, determine whether an illumination of an image captured by the far camera is abnormal as a result of an illumination change ahead of the vehicle; and
    the electronic control unit being configured to, when the electronic control unit determines that the illumination of the image captured by the far camera is abnormal, execute aperture control over the near camera,
    wherein the electronic control unit being further configured to, when the electronic control unit determines that the illumination of the image captured by the far camera is abnormal, determine whether the vehicle is placed at a preset aperture adjustment start timing based on a travel distance of the vehicle or an elapsed time, wherein the electronic control unit is configured to, when the electronic control unit determines that the vehicle is placed at the aperture adjustment start timing, start the aperture control over the near camera.

5. A method for controlling an in-vehicle camera system including a far camera and a near camera, both of which capture an image ahead of a vehicle, the method comprising:
    determining, by an electronic control unit, whether an illumination of an image captured by the far camera is abnormal as a result of an illumination change ahead of the vehicle during travel of the vehicle; and in response to the electronic control unit determining that the illumination of the image captured by the far camera is abnormal, executing an aperture control over the near camera, wherein the electronic control unit is configured to adjust an aperture of the near camera in multiple levels based on a travel distance of the vehicle or an elapsed time as the aperture control over the near camera.

6. The method according to claim 5 further comprising:

in response to the electronic control unit determining that the illumination of the image captured by the far camera is abnormal, determining whether the vehicle is placed at a preset aperture adjustment start timing based on a travel distance of the vehicle or an elapsed time; and in response to the electronic control unit determining that the vehicle is placed at the aperture adjustment start timing, starting the aperture control over the near camera.

7. The method according to claim 5 further comprising:

in response to the electronic control unit determining that the illumination of the image captured by the far camera is abnormal, determining whether the illumination of the image captured by the far camera is normalized in course of travel of the vehicle; and in response to the electronic control unit determining that the illumination of the image captured by the far camera is normalized, canceling the aperture control over the near camera.

* * * * *